United States Patent [19]

Parquet

[11] 4,014,213

[45] Mar. 29, 1977

[54] ACCUMULATOR WARNING SYSTEM

[75] Inventor: Donald James Parquet, Burlington, Iowa

[73] Assignee: J. I. Case Company, Racine, Wis.

[22] Filed: Dec. 1, 1975

[21] Appl. No.: 636,688

[52] U.S. Cl. .............................. 73/290 R; 138/30; 138/31; 188/151 A; 200/83 W; 200/212; 340/60

[51] Int. Cl.² ................ G01F 23/18; B60T 11/10; F16L 55/04; H01H 35/34

[58] Field of Search .......... 73/290 R; 138/31, 104, 138/30; 188/151 A; 200/81.4, 82 D, 83 N, 83 W, 212; 303/84 A; 340/52 B, 52 C, 60

[56] References Cited

UNITED STATES PATENTS

| | | | |
|---|---|---|---|
| 2,239,348 | 4/1941 | Wirtanen et al. | 340/52 C X |
| 2,484,177 | 10/1949 | Mapes et al. | 303/84 A |
| 3,008,548 | 11/1961 | Moyer | 303/84 R X |
| 3,613,734 | 10/1971 | Elmer | 138/31 |
| 3,677,334 | 7/1972 | Bathla et al. | 138/31 X |
| 3,862,646 | 1/1975 | Tarsha | 138/31 X |
| 3,940,585 | 2/1976 | Schaad | 200/16 C X |

*Primary Examiner*—Richard C. Queisser
*Assistant Examiner*—John S. Appleman
*Attorney, Agent, or Firm*—Arthur J. Hansmann

[57] ABSTRACT

An accumulator warning system utilizing an electric system with an electric signal and wherein a movable member is disposed in a container having a gas on one side of the member and oil on the other side of the member. The movable member moves toward electric conductors when the gas in the container is depleted, and thus the electric signal is activated.

3 Claims, 2 Drawing Figures

ACCUMULATOR WARNING SYSTEM

This invention relates to an accumulator warning system, and, more particularly, it relates to an electric system for use in a gas and oil type of accumulator to signal when the gas is depleted in the accumulator.

BACKGROUND OF THE INVENTION

Accumulators of the type having a fluid on each side of a movable member, such as a diaphragm or a piston, wherein depletion of the fluid on one side of the member causes movement of the member and energizes a signal is already known in the art. U.S. Pat. Nos. 2,484,177 and 3,008,548 and 3,224,816 and 3,363,074 are related to safety signals for vehicle brake systems. The prior art is therefore aware of the utilization of accumulators for signaling the loss of fluid pressure in a system, such as a vehicle brake system.

However, the present invention is an improvement upon the prior art in that it provides an accumulator which is utilized for a vehicle brake system and which has hydraulic oil on one side of a movable member and which has a gas on the other side of the movable member, and the present invention provides a means for detecting the depletion of the gas and the consequent loss of its pressure and consequently there is a safety warning system. Still further, the present invention provides means for accomplishing the aforementioned by utilizing either a sliding piston or a flexible diaphragm, both of which are disposed within a fluid-tight container and which move in a direction to complete an electric circuit for purposes of creating an electric signal in the warning system.

Still further, the present invention provides an accumulator warning system of a multiple stage type and wherein it can be utilized for detecting the depletion of a gas pressure in a vehicle brake system, for instance, and the first stage of warning may be a preliminary warning with the activation of a preliminary warning signal, and the subsequent stage or stages can then provide additional or final warning as to a more serious or complete depletion of a fluid pressure in the accumulator. Still further, the present invention provides an accumulator warning system wherein the apparatus is reliable and sturdy and can be readily and easily provided and is capable of continuous and repeated operations, and the system is basically arranged so that it will not be self-damaging but will actually provide for extended movement of the movable parts without interfering with the warning operation and without damaging itself.

Accordingly, the present invention provides an accumulator warning system which is useful in vehicle steering systems, brake systems, and in other installations where pressurized fluids are employed, and the system provides an early and a final warning for depletion and leakage of the fluid employed in the system and, as such, the system is in the nature of a safety device and assures that the operator will be informed as to the condition of the system, according to the energizing of a signal, either visible or audible.

Other objects and advantages will become apparent upon reading the following description in light of the accompanying drawings.

DETAILED DESCRIPTION OF THE PREFERRED EMBODIMENTS

Figure 1:
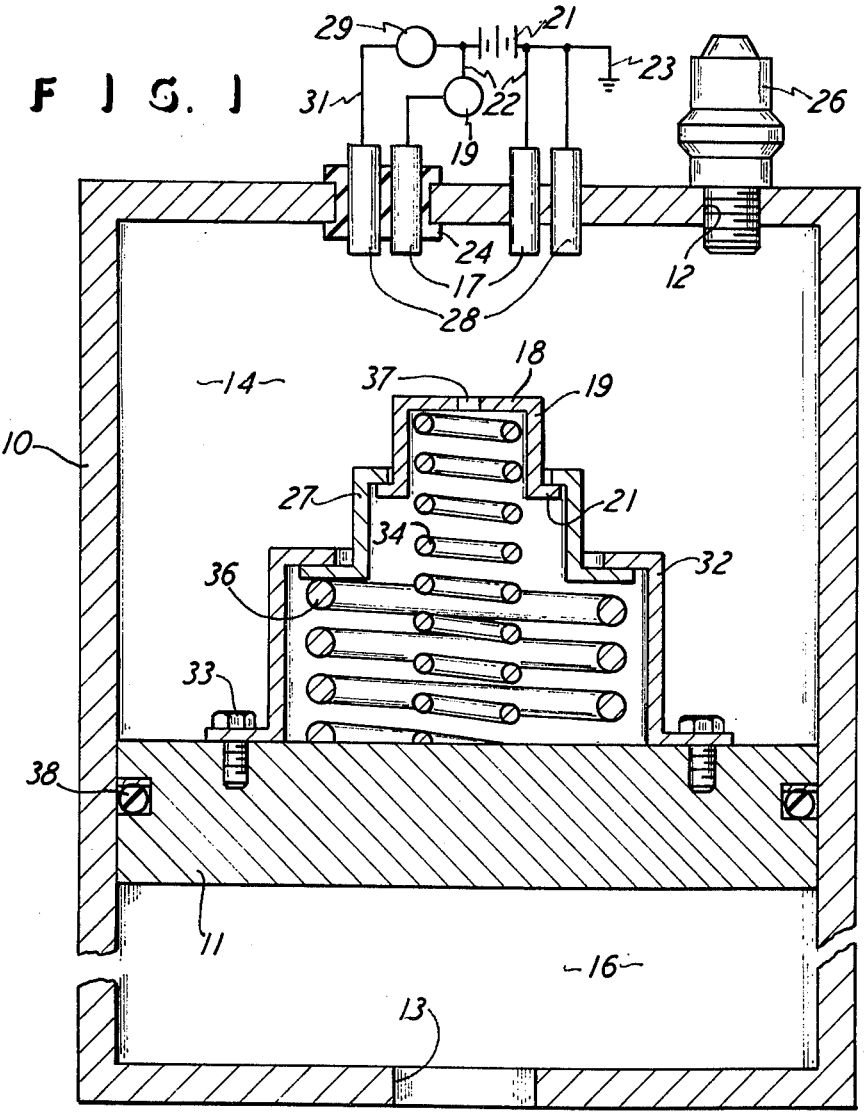
FIG. 1 is a sectional view of one embodiment of this invention utilizing a cylinder and piston arrangement.

FIG. 1 shows the accumulator to include the container 10 in the form of a cylinder having a piston 11 movable therein. The container has fluid passageways 12 and 13 at opposite sides thereof, and the piston 11 divides the cylinder or container 10 into two compartments 14 and 16. It will be understood, by one of ordinary skill in the art, that the compartment 16 would normally contain oil, and the compartment 14 contains a gas, such as nitrogen gas. Further, the accumulators shown in FIGS. 1 and 2 can be used in vehicle brakes, steering, or other similar installations where fluid or hydraulic pressure is utilized, and the accumulators shown attach into the systems mentioned for the purpose of maintaining a pressure on the liquid or oil in the compartment 16, by virtue of the pressure of the gas in the compartment 14, all for conventional and well known reasons understood by anyone skilled in the art.

Electrical conductors 17 are mounted in the end wall of the cylindrical container 10, and the conductors 17 extend toward and are exposed to the electric conductive member 18 which is mounted on the piston 11. Thus, the member 18 is shown to be hat-shaped, and it has a crown portion 19 and a circular brim portion 21, and the member 18 is made of an electric conductive material and has an overall span from side to side, as viewed in FIG. 1, such that when it is moved into contact with the conductors 17, it spans the spacing between the conductors 17 and thus simultaneously contacts the two conductors 17 which form one set of conductors. That is, the piston 11 moves in the axial direction of the cylindrical container 10 and toward the conductors 17 to position the conductive member 18 into contact with the conductors 17, as mentioned. An electric system which includes the conductors 17 and an electric signal 19 and a battery 21 and electric wires 22 is provided and thus creates the energizing of the electric signal 19 when the member 18 is in contact with the conductor 17, as mentioned. The electric signal 19 may be a light or a buzzer, or it may be any other visual or audio signal, and there is also a ground wire 23, and the one conductor 17 is insulated from the container 10 by means of insulation material 24.

Accordingly, if and when the gas pressure in the compartment 14 is depleted or is reduced, then the piston 11 would move toward the conductors 17 and position the conductive member 18 into contact with the two conductors 17 to thus complete the electric circuit described and thereby energize the signal 19 and warn the operator of the depleted condition of the gas in the compartment 14. Accordingly, at an appropriate time, the operator could replenish the gas in the compartment 14 and a gas valve 26 is mounted on the container 10 and extends through the fluid passageway 12 to permit the charging of the gas into the compartment 14, as desired.

Additionally, additional electric conductive members may be provided on the piston 11, such as the member 27, and that member is also hat-shaped, as shown, and it has an overall lateral span comparable to the additional set of two conductors 28 which are also suitably mounted on the container 10, as shown. An additional warning signal 29 is connected in the electric circuit, such as by means of the wires shown and including wire 31. Accordingly, when the gas is initially depleted in the compartment 14, the first conductive member 18 spans the conductors 17 and energizes the early warning signal 19. Additional reduction of pressure of the gas in the compartment 14 will cause the piston 11 and the conductive member 27 to further move toward the conductors 28 until the member 27 actually makes contact with the conductors 28, and then the additional or final warning signal 29 is energized as the electric circuit is closed to activate the signal 29 which may also be either a visual or audio type signal, as mentioned. The hat-shaped members 18 and 27 are thus of two different sizes in their respective crown portions shown, and they are telescoped together and move relative to each other and also relative to the piston 11. A cylindrically-shaped mounting member 32 is suitably attached to the cylinder 11 by means of screws 33, and the member 32 limits the outward telescoping motion of the conductive members 19 and 27 which are under the influence of respective compression springs 34 and 36.

With this arrangement, the accumulator in FIG. 1 shows a multi-stage warning system which is both an early warning and a final warning arrangement with signals 19 and 29, respectively. Further, the piston 11 will move toward the two sets of conductors 17 and 28, and, even when the conductive members 18 and 27 are in contact with the respective conductors 17 and 28, the piston can move still further toward the conductors, depending upon the actual balance of fluid pressure on axially opposite sides of the piston 11 and in the compartments 14 and 16, and there will be no restraint of the piston 11 or any damage to the parts involved, since the members 19 and 27 will simply retain their position of contact with the respective conductors 17 and 28 and the springs 34 and 36 will yield to permit the additional upward movement of the piston 11. Further, when the compartment 14 is recharged with gas, the members 19 and 27 regain the positions shown in FIG. 1, and they are not damaged and they simply re-establish the positions shown in FIG. 1. Also, to assure that there will be equilibrium of fluid pressure to the interior as well as the exterior of the members 19 and 27 and 32, a fluid passageway 37 is provided in the outer member 19 to permit fluid to flow to the interior and exterior of those members mentioned. Still further, it will be understood that the piston 11 is stable within the cylindrical container 10 and will not cock therein, and a fluid O-ring 38 extends around the piston 11 to seal the piston 11 with the interior walls of the cylindrical container 10 to thereby provide the fluid-tight arrangement of the piston 11 in the container 10.

Figure 2:
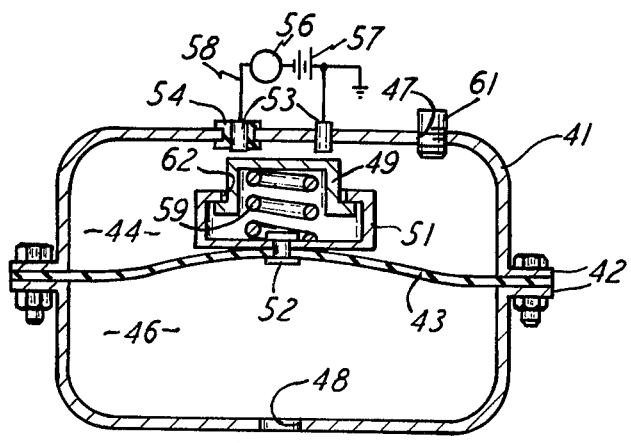
FIG. 2 is a sectional view of another embodiment of this invention utilizing a diaphragm.

FIG. 2 shows another embodiment of the accumulator having a container 41 which has a continuous flange 42 securing and presenting a flexible diaphragm 43 which extends across the accumulator to present the upper compartment 44 and the lower compartment 46 which have the respective fluid passageways 47 and 48, all for the purpose mentioned in connection with FIG. 1. In FIG. 2, there are the telescoping members 49 and 51, and these are secured to the diaphragm 43, such as by the rivet or connector 52, and thus the members 49 and 51 move with the displacement of the diaphragm 43 which in turn is responsive to the pressures in the compartments 44 and 46. Thus, the member 49 is hat-shaped and has a lateral span which is sufficient to extend between and contact electric conductors 53 which are mounted in the container 41, as shown. An electric insulation piece 54 extends around one of the conductors 53 to insulate it from the container 41, and an electric signal 56 and a battery 57, connected by wires such as wire 58, are included in the electric system and thus provide energizing of the signal 56 when the member 49 contacts the conductors 53 after the diaphragm 43 moves upwardly to the point of contact mentioned. Also, a compression spring 59 urges the member 49 to the upper position shown in FIG. 2, and the spring therefore permits the continued rise of the diaphragm 43 and the affixed mounting member 51 after the member 49 is already in contact with the conductors 53, all as mentioned in connection with FIG. 1 and its springs 34 and 36. Still further, a gas valve 61 extends into the container fluid passageway 47 and is therefore available for recharging the compartment 44, as needed and desired. In the telescoping arrangement of the conductive members in both FIGS. 1 and 2, the appropriate member has an opening, such as the opening 62 in FIG. 2, for the purpose of the telescoping action of the conductive member which extends through that particular opening, such as the opening 62. Further, it will be seen and understood that the respective conductors are spaced apart equal to the distance or span across the respective conductive member, and the conductors and the conductive members are disposed in sets for purposes of the multiple warning system shown and described in connection with FIG. 1.

Accordingly, the accumulator of this invention can be used for the purpose of maintaining a liquid pressure, such as oil, on a system which is not shown herein but which will be understood by one skilled in the art, and the gas, such as nitrogen, is an inert gas which is compatible with the electric system and of course is not responsive to the making and breaking of the electric contacts at the conductors. Accordingly, this invention provides an accumulator of the type described and one for the purposes mentioned, and it provides the early warning of the gas leakage and it provides continuous warning and for a sufficient time to enable the operator to recharge the gas compartment, and the switch mechanism shown and described herein is not subject to self-damage in the event of loss of the gas charge, and the system permits repeated cycling between its operative and inoperative positions.

What is claimed is:

1. An accumulator warning system comprising a fluid container having fluid passageways at opposite ends thereof, a divider member movably and fluid-tightly disposed in said container for dividing said container into two compartments in fluid-flow communication with respective ones of said passageways, electric conductors disposed in one of said compartments and being spaced apart and disposed in the path of movement of said divider member, an electric system connected with said conductors and including an electric power source and an electric signal, an electrically conductive member movably mounted on said divider member and extending therefrom toward said conductors and having a span at least equal to the spacing between said conductors and being movable on said divider member in the direction of movement of said divider member, a spring operatively associated with said conductive member for yieldingly urging said conductive member toward said conductors for yielding to the movement of said divider member toward said conductors after said conductive member is in contact with said conductors to thereby permit said divider member to move further toward said conductors after said conductive member is in contact with said conductors for energizing said signal, said conductive member being hat-shaped and having a crown portion and a brim portion, said crown portion being disposed toward said conductors and said brim portion being disposed toward said divider member, a flanged cylinder mounted on said divider member and having an end opening for telescopically receiving said crown portion and having a flange surrounding said end opening and being of a size smaller than the extent of said brim portion to overlap the latter and thereby movably restrain said conductive member relative to said divider member, an additional hat-shaped conductive member telescoped with and extending beyond and being smaller than the first said hat-shaped conductive member, additional said electric conductors disposed in said one compartment and spaced apart less than the spacing between the first said electric conductors and at a distance to match the span of said additional hat-shaped conductive member, a spring disposed to yieldingly urge said additional hat-shaped conductive member toward said additional conductors, and an additional electric signal connected to said additional conductors and to said electric system.

2. An accumulator warning system comprising a fluid container having fluid passageways at opposite ends thereof, a divider member movably and fluid-tightly disposed in said container for dividing said container into two compartments in fluid-flow communication with respective ones of said passageways, electric conductors disposed in one of said compartments and being spaced apart and disposed in the path of movement of said divider member, an electric system connected with said conductors and including an electric power source and an electric signal, an electrically conductive member movably mounted on said divider member and extending therefrom toward said conductors and having a span at least equal to the spacing between said conductors and being movable on said divider member in the direction of movement of said divider member, a spring operatively associated with said conductive member for yieldingly urging said conductive member toward said conductors for yielding to the movement of said divider member toward said conductors after said conductive member is in contact with said conductors to thereby permit said divider member to move further upward toward said conductors after said conductive member is in contact with said conductors for energizing said signal, a plurality of sets of said electric conductors disposed on said container at respective and different spacings between said conductors in the respective said sets, a plurality of said electric conductive members with one thereof for each of said sets of said conductors and with at least some thereof being movably mounted on said divider member in the direction of movement of said divider member for respectively spanning said sets of said conductors to make electric contact within said sets, a plurality of electric signals for respective ones of said sets of said conductors, and there being one of said spring for each of at least some respective ones of said conductive members for yieldingly urging said some of said conductive members toward their respective said sets of said conductors, whereby multiple stage signaling is achieved.

3. The accumulator warning system as claimed in claim 2, including a gas valve in said fluid passageway at said one compartment and being fluid-tightly connected with the latter said passageway and with said one compartment being fluid tight from the interior thereof for charging said one compartment with gas.

* * * * *